United States Patent
Arikan et al.

(10) Patent No.: US 7,317,417 B2
(45) Date of Patent: Jan. 8, 2008

(54) METHODS FOR DETECTION AND TRACKING OF TARGETS

(76) Inventors: Orhan Arikan, Bilkent University Housing No. 29/4, Bilkent, Ankara (TR) 06533; Ahmet Kemal Ozdemir, Guzelevler Sisli Sokak No. 22/7, Yenimanhalle, Ankara (TR) 06170; Donald Spyro Gumas, 7910 W. Brookridge Dr., Middletown, MD (US) 21769

( * ) Notice: Subject to any disclaimer, the term of this patent is extended or adjusted under 35 U.S.C. 154(b) by 185 days.

(21) Appl. No.: 11/180,811

(22) Filed: Jul. 12, 2005

(65) Prior Publication Data

US 2006/0082491 A1    Apr. 20, 2006

Related U.S. Application Data

(60) Provisional application No. 60/587,613, filed on Jul. 12, 2004, provisional application No. 60/589,660, filed on Jul. 20, 2004.

(51) Int. Cl.
*G01S 13/66* (2006.01)

(52) U.S. Cl. ............ 342/95; 342/195; 342/104; 342/109; 342/89; 342/99; 342/196

(58) Field of Classification Search ............ 342/95–97, 342/195, 196, 104, 109, 89, 99
See application file for complete search history.

(56) References Cited

U.S. PATENT DOCUMENTS

| | | | |
|---|---|---|---|
| 3,827,629 A | 8/1974 | Max et al. | 708/4 |
| 4,339,176 A | 7/1982 | Lee | 359/19 |
| 4,389,092 A | 6/1983 | Tamura | 359/559 |
| 4,440,472 A | 4/1984 | Cohen | 359/310 |
| 4,462,032 A | 7/1984 | Martin | 342/25 D |
| 4,468,093 A | 8/1984 | Brown | 359/310 |
| 4,531,195 A | 7/1985 | Lee | 708/816 |
| 5,416,488 A | 5/1995 | Grover et al. | 342/159 |
| 5,555,532 A | 9/1996 | Sacha | 367/88 |
| 5,583,512 A | 12/1996 | McEligot | 342/189 |
| 5,808,580 A * | 9/1998 | Andrews, Jr. | 342/162 |
| 6,232,913 B1 * | 5/2001 | Lehtinen | 342/137 |
| 6,636,174 B2 | 10/2003 | Arikan et al. | 342/195 |
| 7,081,848 B1 * | 7/2006 | Adams | 342/118 |

(Continued)

FOREIGN PATENT DOCUMENTS

JP    61212781    9/1986

OTHER PUBLICATIONS

P. M. Woodward, Probability and Information Theory, with Applications to Radar, McGraw-Hill Book Co., Inc., pp. 115-125, 1953.

(Continued)

*Primary Examiner*—John B Sotomayor
(74) *Attorney, Agent, or Firm*—Jones Day

(57) ABSTRACT

The present invention relates to active sensor applications, and more particularly is directed to efficient systems and methods for detection and tracking of one or more targets. The invention provides a method for receiving signals reflected from one or more targets, processing the received signals and the transmitted signal to compute two or more slices of the cross ambiguity function associated with the signals, and estimating the signal delay and the Doppler shit associated with the targets from the computed slices.

29 Claims, 12 Drawing Sheets

U.S. PATENT DOCUMENTS

| | | | |
|---|---|---|---|
| 7,221,701 B2* | 5/2007 | Arikan et al. | 375/148 |
| 7,224,721 B2* | 5/2007 | Betz et al. | 375/152 |
| 2004/0042531 A1* | 3/2004 | Arikan et al. | 375/148 |
| 2004/0071200 A1* | 4/2004 | Betz et al. | 375/152 |
| 2004/0085241 A1* | 5/2004 | Arikan et al. | 342/195 |
| 2006/0082491 A1* | 4/2006 | Arikan et al. | 342/95 |

OTHER PUBLICATIONS

V. Namias, "The fractional order Fourier transform and its application to quantum Mechanics", J. Inst. Math. Appl., vol. 25, pp. 241-265, 1980.

W. Lohmann and B. H. Soffer, "Relationships between the Radon-Wigner and fractional Fourier transforms", J. Opt. Soc. Am. A, vol. 11, pp. 1798-1801, 1994.

A. K. Özdemir and O. Arikan, "Fast computation of the ambiguity function and the Wigner distribution on arbitrary line segments", IEEE trans. Signal Process., vol. 49, No. 2, pp. 381-393, Feb. 2001.

A. K. Özdemir and O. Arikan, "Efficient computation of the ambiguity function and the Wigner distribution on arbitrary line segments", in Proc. IEEE Int. Symp. Circuits and Systems, vol. IV, pp. 171-174, May 1999.

I. Raveh and D. Medlovic, "New properties of the Radon transform of the cross-Wigner/ambiguity distribution function", IEEE Trans. Signal Process., vol. 47, No. 7, pp. 2077-2080, Jul. 1999.

D. Mendlovic and H. M. Ozaktas, "Fractional Fourier transforms and their optical implementation: I" J. Opt. Soc. Am. A. vol. 10, pp. 1875-1881, 1993.

H. M. Ozaktas and D. Mendlovic, "Fractional Fourier transforms and their optical implementation: II", J. Opt. Soc. Am. A, vol. 10, No. 12, pp. 2522-2531, 1993.

H. M. Ozaktas, O. Arikan, M. A. Kutay and G. Bozdagi, "Digital computation of the fractional Fourier transform", IEEE Trans. Signal Process., vol. 44, No. 9, pp. 2141-2150, Sep. 1996.

L. B. Almedia, "The fractional Fourier transform and time-frequency Representations", *IEEE Trans. Signal Process.*, vol. 42, No. 11, pp. 3084-3091, Nov. 1994.

L. Cohen, "Time-frequency distributions—A review", Proc. IEEE, vol. 77, No. 7 pp. 941-981, Jul. 1989.

R. N. Bracewell, The Fourier Transform and its Applications, McGraw-Hill Book Company, pp. 356-381, 1978.

G. H. Golub and C. F. Van Loan, Matrix Computations, Baltimore: John Hopkins University Press, pp. 206-209, 222-227, 236-241, 248-253, 256-259, 1996.

P. W. East (ed.), Advanced ESM Technology, Microwave Exhibitions and Publishers Ltd., 1988.

V. G. Nebabin, Methods and Techniques of Radar Recognition, Artech House, Inc., pp. 106-125, 1995.

R. E. Blahut, W. Miller and Jr. C. H. Wilcox, Radar and Sonar—Part 1, Springer—Verlag, vol. 32, pp. 1-5, 10-17, 26-29, 1991.

R. E. Kalman, "A new approach to linear filtering and prediction problems", J. Basic Engineering, Trans. ASME Series D, vol. 82, pp. 35-45, 1960.

Per-Olof Gutman and Mordekhai Velger, "Tracking Targets Using Adaptive Kalman Filtering", IEEE Trans. Aerospace and Electronic Systems, vol. 26, No. 5, pp. 691-699, Sep. 1990.

L. R. Rabiner, R. W. Schafer and C. M. Rader, "The Chirp z-Transform Algorithm", IEEE Trans. Audio and Electroacoustics, vol. AU-17, No. 2, pp. 86-92, Jun. 1969.

IBM Tech. Discl. Bull. (vol. 28, No. 9; pp. 4023-4025); "Processing the Echo from Range-Dependent Multiplexed Pulses in Range-Doppler Radar"; Published Feb. 1, 1986; IBM Corp.; Armonck, NY.

IBM Tech. Discl. Bull. (vol. 36, No. 1; pp. 226-227); "Computing the Aliased Ambiguity Surface"; Published Jan. 1, 1993; IBM Corp.; Armonck, NY.

D. Lush, "Airborne Radar Analysis Using the Ambiguity Function"; Proceedings of the IEEE International Radar Conference; pp. 600-605; copyrighted in the year 1990; IEEE Pub. No. CH2882-9/90/000-0600$1.0.

F. Hlawatsch et al., "The Ambiguity Function of a Linear Signal Space and its Application to Maximum-Likelihood Range/Doppler Estimation"; copyrighted in the year 1992; IEEE Pub. No. 0-7803-0805-0/92$3.00.

A.V. Dandawate et al., "Differential delay-Doppler estimations using second and higher-order ambiguity functions," 140 IEEE Proceedings 410-18 (Dec. 1993).

M. Rendas et al., "Ambiguity in Radar and Sonar," 46 IEEE Transactions on Signal Processing 294-205 (Feb. 1998).

C.Y. Yin et al., "Performance Analysis of the Estimation of Time Delay and Doppler Stretch by Wideband Ambiguity Function," IEEE Publication 0-7803-4308-5/98$10.00 452-55 (1998).

A. Dogandzic et al., "Estimating Range, Velocity, and Direction with a Radar Array," IEEE Publication 0-7803-5041-3/99$10.00 2773-76 (1999).

W.K. Chung et al., "Pulse-Diverse Radar Waveform Design for Accurate Joint Estimation of Time Delay and Doppler Shift," Proceedings of the IEEE International Conference on Acoustics, Speech, and Signal Processing 3037-40 (2000).

A. Dogandzic et al., "Cramer-Rao Bounds for Estimating Range, Velocity, and Direction with a Sensor Array," IEEE Publication 0-7803-6339-6/00$10.00 370-74 (2000).

Misc. Prior Art Search Results (Patent Material-related search, Jul. 8, 2004; IEEE Searches, 2004).

PCT International Preliminary Examination Report for Int'l Application No. PCT/US2001/18408 completed Mar. 28, 2002.

PCT International Search Report for Int'l Application No. PCT/US2001/18408 completed Jul. 26, 2001.

EPO Communication for European Patent Application No. 01942045.4 dated May 24, 2006.

Zavarsky et al—Introduction of cross ambiguity function for elimination of crossterms in Wigner distribution of the third order, Electronics Letters, vol. 32, No. 2, Jan. 18, 1996.

Dragoman et al—Implementation of the spatial and the temporal cross-ambiguity function for waveguide fields and optical pulses, Applied Optics, vol. 38, No. 5, Optical Society of America, Feb. 10, 1999.

Simon et al—Spread Spectrum Communications Handbook, pp. 1158-1214, McGraw-Hill, Inc., 1994.

Wood et al—Tomographic time-frequency analysis and its application toward time-varying filtering and adaptive kernel design for multiple component linear-fm signals, IEEE Trans. Signal Process., vol. 42, pp. 2094-2104, Aug. 1994.

Wood et al—Linear signal synthesis using the Radon-Wigner transform, IEEE Trans. Signal Process., vol. 42, pp. 2105-2166, Aug. 1994.

Wood et al—Radon transformation of time-frequency distributions for analysis of multicomponent signals, IEEE Trans. Signal Process., vol. 42, pp. 3166-3177, Nov. 1994.

Price—A Communication Technique for Multipath Channels, 46 Proc. Inst. Rad. Eng. 555-70 (Mar. 1958).

Faux et al—Computational Geometry for Design and Manufacture, pp. 304-308, Ellis Horwood 1979.

Foley et al—Introduction to Computer Graphics, pp. 321-368, Addison-Wesley 1994.

Rogers et al—Mathematical Elements for Computer Graphics, 2nd edition, pp. 400-425, McGraw Hill 1989.

Proakis—Digital Communications, pp. 232-242, McGraw-Hill, NY, 1995.

Cooper et al—Modern Communications and Spread Spectrum, pp. 345-375, McGraw-Hill Book Co., 1986.

European Patent Office Communication, dated Mar. 2, 2006 with Supplementary European Search Report dated Feb. 22, 2006, App. No. 01942045.4 -2220 PCT/US0118408.

Ozdemir A. K., et al.: "Efficient Computation of the Ambiguity Function and the Wigner Distribution on Arbitrary Line Segments," Proceedings of the 1999 IEEE International Symposium on, Circuits and Systems, 1999. ISCAS '99. Jul. 1999, pp. 171-174 vol. 4, May 30, 1999-Jun. 2, 1999, Orlando, FL, USA Proceedings of the 1999 IEEE International Symposium in Orlando, FL, USA May 30-Jun. 2, 1999. Piscataway, NJ, USA, IEEE, US, vol. 4, May 30, 1999, pp. 171-174, XP010341157, ISBM: 0-7803-5471-0.

Ozaktas H. M., et al.: "Digital Computation of the Fractional Fourier Transform" IEEE Transactions on Signal Processing, IEEE Service Center, New York, NY, US, vol. 44, No. 9 Sep. 1996, pp. 2141-2150, XP000637522, ISSN: 1053-587X.

Lush D. C.: "Airborne Radar Analysis Using the Ambiguity Function," IEEE, May 7, 1990, pp. 600-605, XP010007427.

Haldun M. Ozaktas, Zeev Zalevsky and M. Alper Kutay. "The Fractional Fourier Transform with Applications in Optics and Signal Processing". John Wiley & Sons (2001). Series in Pure and Applied Optics.

* cited by examiner (A)

(B)

(A)

(B)

(A)

(B)

(A)

(B)

METHODS FOR DETECTION AND TRACKING OF TARGETS

This application claims priority of provisional applications Ser. Nos. 60/587,613 and 60/589,660 filed on Jul. 12, 2004 and Jul. 20, 2004, respectively, which are incorporated herein by reference.

FIELD OF INVENTION

The present invention relates to active sensor applications, and more particularly is directed to efficient systems and methods for detection and tracking of one or more targets.

BACKGROUND OF INVENTION

Detection and tracking of targets by sensor systems have been the subject matter of a large number of practical applications. Sensor systems designed for this purpose may use propagating wave signals, such as electromagnetic or acoustical signals. Some sensor systems, such as radar and active sonar systems, are designed to receive reflections of a transmitted signal generated by an appropriate transmitter, and determine the presence of objects by analyzing the transmitted and the reflected signals.

Active sensor systems are generally used for detection of scattering objects. In the presence of a scattering object, the transmitted signal arrives to the receiving sensor system with a certain time delay, which is related to the range of the scattering object (i.e., the distance to it). Also, if the scattering object is moving, the reflected signal exhibits a spectral shift that is known as a Doppler shift. The Doppler shift is related to the relative velocity of the object with respect to the sensor system. In order to provide an example of a received signal in an active sensor system, a simulation has been conducted for a radar system that transmits a phase-coded radar signal as shown in FIG. 1A. In this simulation, the transmitted signal reflects back from an object, at a 12 km range, moving with a velocity of 400 m/s towards the radar system. The reflected signal is received by the radar antenna and down-converted by a conventional analog receiver system, such as shown in FIG. 2. The output of the analog receiver system is shown in FIG. 1B, where the effects of the object range and velocity are seen as a delay and an additional frequency modulation of the received signal, respectively. These two prominent effects of the received signal can be more readily observed on the cross-ambiguity function of the transmitted and received signals, which is defined as:

$$A_{rs}(\tau, v) = \int r(t+\tau/2)s^*(t-\tau/2)\exp[j2\pi vt]dt,$$

where s(t) is the transmitted signal and r(t) is the received signal. For the transmitted and received signal pair shown in FIGS. 1A and 1B, respectively, the magnitude of the cross-ambiguity function is illustrated in FIG. 1C as a 3-Dimensional plot. In FIG. 1D, the contour plot of the same cross-ambiguity function is provided. Since it is easier to visualize the structure, contour plots of the cross-ambiguity function are more commonly used in practice. As seen in FIG. 1D, the peak of the cross-ambiguity function is located at the corresponding delay and Doppler shift caused by the scattering object. This observed correspondence between the peak location of the cross-ambiguity function on one hand, and the position and the velocity of the scattering object on the other is a general relationship, which holds true in most cases where there is no or little noise at the receiver.

In the case of a noisy reception of the reflected signal, the peak location of the cross-ambiguity function still provides a reliable estimate of the delay and the Doppler shift caused by the scattering object. Therefore, in accordance with the present invention it is possible to detect the presence of one or more scattering object by finding the peak locations of the cross-ambiguity function and comparing them with appropriately chosen threshold levels. Those peaks that exceed the thresholds can be identified as scattering objects, and the locations of the peaks will provide the corresponding delay and Doppler shift information at the same time. Such peaks of the cross ambiguity function may be computed by calculating the entire cross-ambiguity function and then examining it for peaks. This computation is complex and processor intensive.

The main objective of the present application is to provide an efficient and low-cost system and method that can reliably detect scattering objects and estimate both their delay (i.e. distance to the radar) and their Doppler shifts at the same time, without actually computing the entire cross-ambiguity function. One such method is known in the art and is disclosed in U.S. Pat. No. 6,636,174, incorporated herein by reference. To detect a target in accordance with the U.S. Pat. No. 6,636,174 patent, two projections at different angles of the cross-ambiguity function are computed. A projection is a collection of integrals (or summation of samples) taken over uniformly spaced paths perpendicular to the axis of the projection in the Doppler shift/time delay plain at a selected angle. The angle of the projections would be pre-determined by the environment, i.e. advanced knowledge of the approximate velocity and direction of the scattering objects.

Another method for detection of objects is disclosed in U.S. Pat. No. 7,218,274, incorporated herein by reference. To detect a target, in accordance with the methods disclosed in U.S. Pat. No. 7,218,274, a projection is computed first and then if a peak on this projection is detected, a slice passing through the peak of the projection is computed to localize the peak of the cross-ambiguity function, where a slice is a plurality of samples of the cross-ambiguity function lying over a line or line segment. The angle of the projection would be pre-determined by the environment, or, alternatively, a plurality of projections at different angles may be calculated and the one with the highest peaks is chosen as the basis for further computations. All projections may be calculated without sending and receiving additional pulses.

In the present application, more efficient methods of detection of targets are disclosed.

SUMMARY OF THE INVENTION

According to the methods of the present application, the first slice with a selected angle is computed to detect the presence of a target in the cross-ambiguity domain. Once there is one or more detected peaks on this first slice, one or more second slices that pass through the detected peaks of the first slice are computed.

The methods disclosed in this application are based on the simultaneous computation of distance and Doppler shift information using fast computation of certain samples of the cross-ambiguity function of received signals and transmitted signals along an arbitrary line, called a slice, in a Doppler shift/time delay plain. By utilizing discretization of the obtained analytical expressions, efficient algorithms are disclosed in accordance with the present invention to compute uniformly spaced samples of the ambiguity function located on arbitrary line segments. Efficient and reliable detection of targets and estimation of their respective range and Doppler velocity are performed by finding peaks on a slice of the cross-ambiguity function and then localizing those peaks by computing one or more second slices at a different angles.

More particularly one embodiment is a method for detecting one or more targets comprising: transmitting a signal; receiving a reflection of the transmitted signal from one or more targets; computing a first slice of the cross-ambiguity function of the transmitted signal and the reflection of the transmitted signal; detecting one or more peaks on the first slice; computing one or more second slices of the cross-ambiguity function of the transmitted signal and the reflection of the transmitted signal through the coordinates of the detected peaks on the first slice; and detecting one or more peaks, corresponding to a distance to the detected targets and a Doppler shift of the detected targets in the cross-ambiguity domain, on each second slice.

Another embodiment is a method for detecting one or more targets comprising: transmitting a first signal; receiving a reflection of the first transmitted signal from one or more targets; computing a first slice of the cross-ambiguity function of the first transmitted signal and the reflection of the first transmitted signal; detecting one or more peaks on the first slice; transmitting a second signal; receiving a reflection of the second transmitted signal from one or more targets; computing one or more second slices of the cross-ambiguity function of the second transmitted signal and the reflection of the second transmitted signal, the second slices passing through the coordinates of the peak on the first slice; and detecting one or more peaks, corresponding to a distance to the detected targets and a Doppler shift of the detected targets in the cross-ambiguity domain, exceeding a second predetermined threshold on each second slice.

BRIEF DESCRIPTION OF THE DRAWINGS

The present invention may be understood more fully by reference to the following detailed description of one of the exemplary embodiments of the present invention, illustrative examples of specific embodiments of the invention, and the appended figures in which:

in FIG. 1B the received signal is shown; in FIG. 1C the 3-dimensional plot of the cross-ambiguity function of the received and transmitted signals is shown; in FIG. 1D contour plot of the cross-ambiguity function of the received and transmitted signals is shown.

DETAILED DESCRIPTION OF THE EMBODIMENTS

Figure 1:
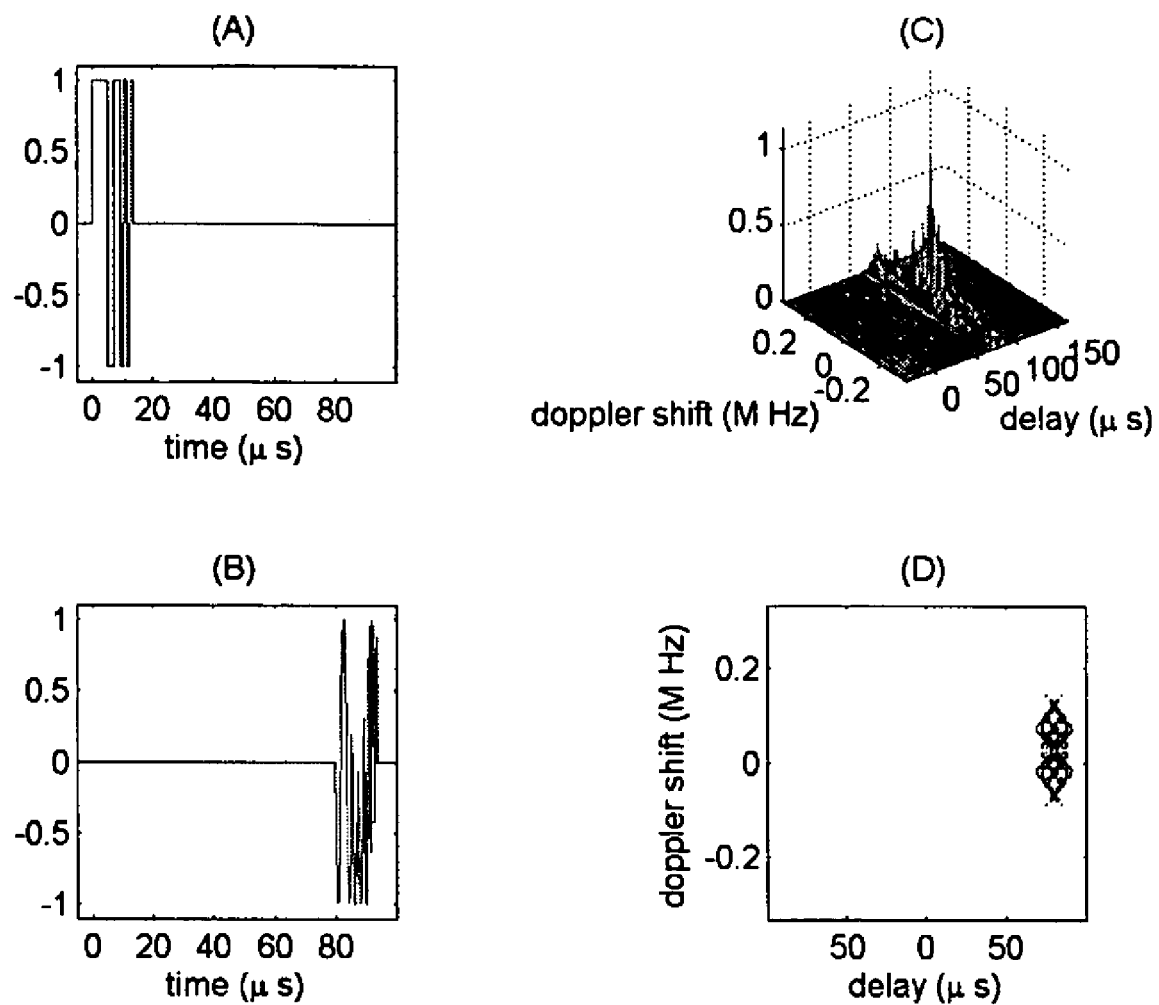
FIG. 1 is an illustration for an active sensor application where in FIG. 1A the transmitted signal is shown.
Figure 2:
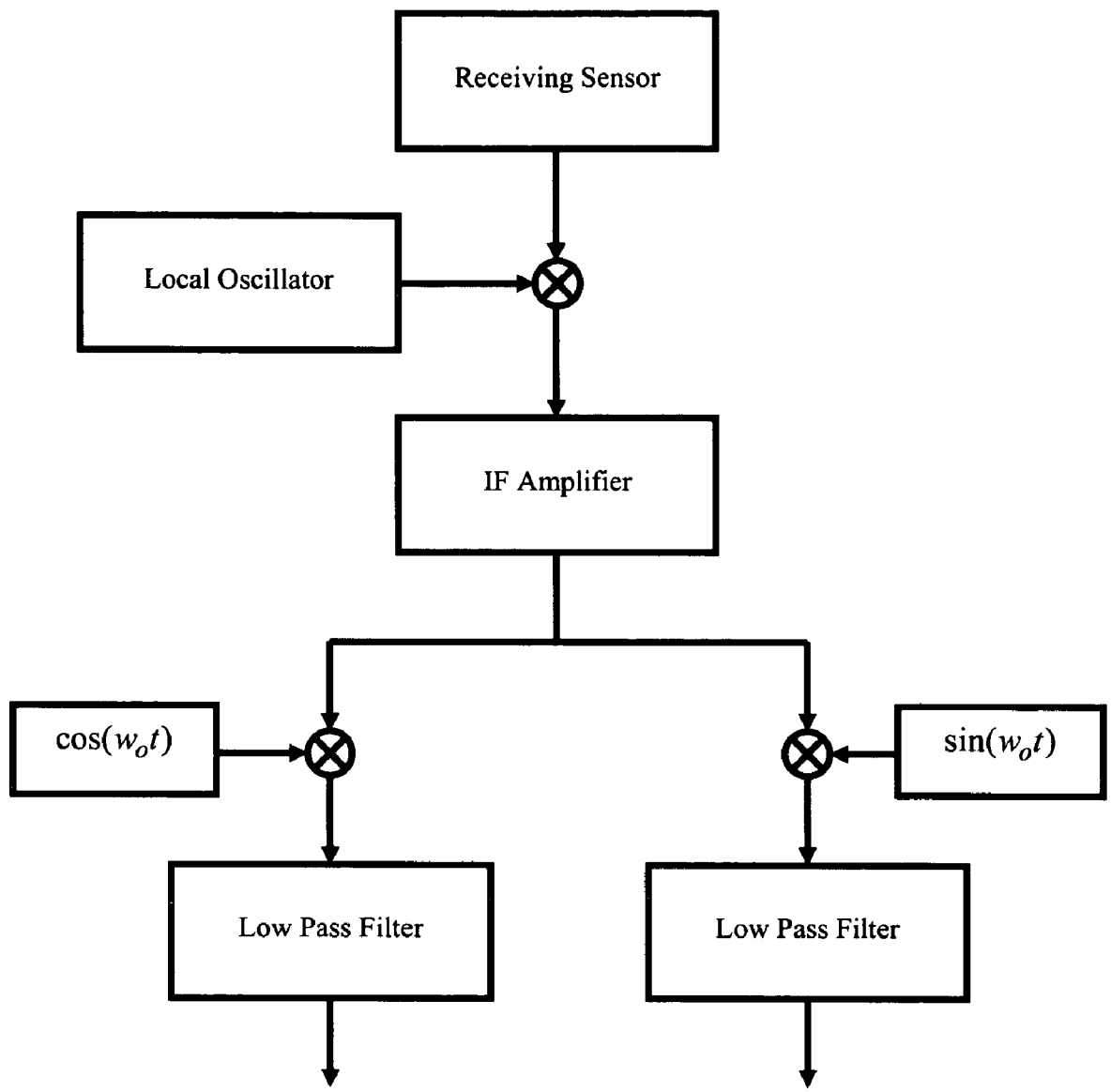
FIG. 2 is a block diagram illustrating the general structure of a conventional analog receiver subsystem, which downconverts the received signal to the baseband providing the inphase and quadrature signal components.

The cross-ambiguity function reveals the presence of an object in sensor applications. However, due to the associated complexity in the implementation of the required processing, detection in the ambiguity domain is rarely used in practice. In this patent application, an alternative method of detection of an object in the ambiguity domain is proposed. In the preferred embodiment, slices of the ambiguity function, which are the samples of the cross-ambiguity function lying over a line or line segment, are used to detect the presence of an object Doppler shift/time delay plain of the cross-ambiguity function. Slices of a cross-ambiguity function can be computed efficiently and accurately by using fractional-Fourier transformation, without computing the entire cross-ambiguity function. The fractional Fourier transformation of a signal x(t) is defined as:

$$x_{2\phi/\pi}(t) = \int K_{2\phi/\pi}(t, t')x(t')dt', \quad (1)$$

where $\phi$ is the transformation angle, and $K_{2\phi/\pi}$ is the transformation kernel defined as:

$$K_{2\phi/\pi}(t, t') = k_\phi \exp[j\pi(t^2 \cot \phi - 2tt' \csc \phi + t'^2 \cot \phi)] \quad (2)$$

and the complex scaling $k_\phi$ defined as:

$$k_\phi = \frac{\exp\{j\phi/2 - \pi/4 sgn\phi\}}{\sqrt{|\sin\phi|}}. \quad (3)$$

The fractional Fourier transformation is a generalization of the ordinary Fourier transformation and reduces to ordinary Fourier transformation for $\phi=\pi/2$. The fast Fractional Fourier transformation algorithm enables efficient computation of the fractional Fourier transformation of a given signal. By using the fast fractional Fourier transformation techniques, the slices of the cross-ambiguity function can be computed efficiently. The governing equation is:

$$A_{rs}(\tau_o + \lambda \sin \phi, v_o + \lambda \cos \phi) = \int \hat{r}_{2\phi/\pi}(\mu)\hat{s}^*_{2\phi/\pi}(\mu) \exp[j2\pi\lambda\mu]d\mu, \quad (4)$$

where $\tau_o$ and $v_o$ are the starting point of the slice, $\lambda$ is the distance of the computed slice sample from the starting point ($\tau_o$, $v_0$) and $\phi$ is the angle of the slice and the integrands are the fractional Fourier transforms of the following shifted and modulated received and transmitted radar signals:

$$\hat{r}(t)=r(t+\tau_o/2)\exp[j\pi v_o t]\hat{s}(t)=s(t-\tau_o/2)\exp[j\pi v_o t]. \quad (5)$$

Figure 3:
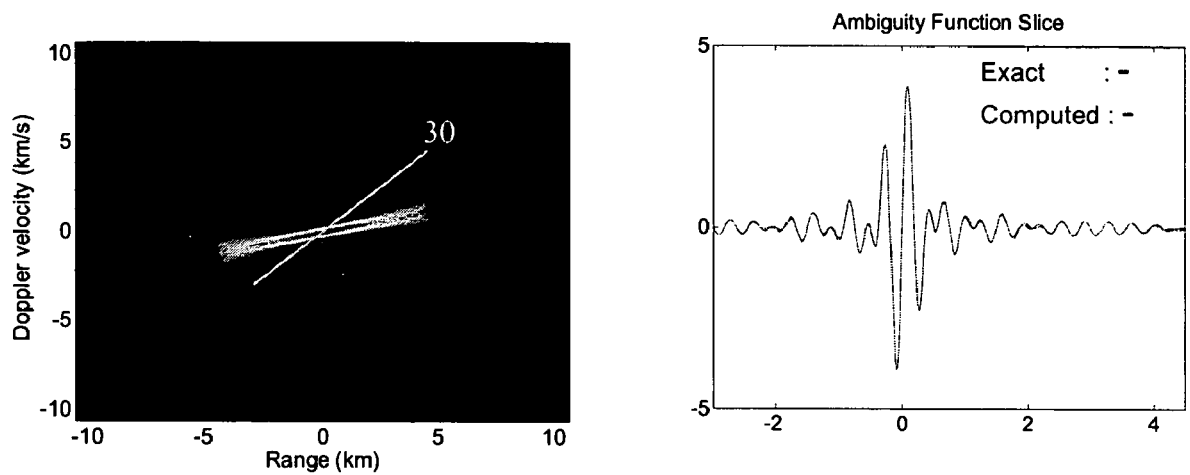
FIG. 3 is an illustration of the accuracy of fast cross-ambiguity function slice computation method. The left figure shows the cross-ambiguity function of a chirp signal on which the location of the computed slice is shown as a green line segment. The right figure shows the accurate matching between the exact and computed samples on this line segment.

To illustrate the accuracy of the computed slices using the above set of equations, a slice of the cross-ambiguity function of a chirp pulse is computed. Since the cross-ambiguity function of the chirp pulse is known analytically, and it is possible to compare the computed slice samples with the samples of the slice derived analytically. FIG. 3A illustrates a cross-ambiguity function of a chirp pulse. An arbitrary slice 30 is computed analytically and by using fast Fourier transformation method. The results of these computations are shown in FIG. 3B. As seen in FIG. 3B, the slice computed with fast Fourier transformation method accurately matches the exact slice.

If a relatively small number of samples of a slice should be computed, the samples can be computed with an alternative method, called a Doppler compensated matched filter, that is computationally less complex than the fractional Fourier transform method. With this alternative method, for the computation of $N_s$ samples of the slice given in equation (4), $A_{rs}(\tau_o+\lambda_k \sin \phi, v_o+\lambda_k \cos \phi)$, k=1, 2, . . . , $N_s$, the following equation can be used:

$$A_{rs}(\tau_o+\lambda_k \sin \phi, v_o+\lambda_k \cos \phi)=\int r(t+(\tau_o+\lambda_k \sin \phi)/2)s^* \\ (t-(\tau_o+\lambda_k \sin \phi)/2)\times\exp[-j2\pi(v_o+\lambda_k \cis \phi)t]dt. \quad (6)$$

where $\tau_o$ and $v_o$ are the starting point of the slice, $\lambda_k$ s the distance from the start point ($\tau_o$, $v_o$) to the $k^{th}$ slice data sample (k goes from 1 to $N_s$ where $N_s$ is the number of samples computed on the slice) and $\phi$ is the angle of the slice.

The above equation (6) provides the desired $A_{rs}(\tau_o+\lambda_k \sin \phi, v_o+\lambda_k \cos \phi)$ sample of a Doppler compensated matched filter by computing the output at time $\tau_o+\lambda_k \sin \phi$ for a Doppler shift of $v_o+\lambda_k \cos \phi$. For computational efficiency, the required output of the Doppler compensated matched filter in equation (6) can be approximated by replacing the integral with a summation over the samples of the transmitted and reflected signals. Hence, with this alternative computation approach, if $N_r$ samples of the transmitted and received signals are used, each sample of the slice is computed by performing approximately $N_r$ multiplications and additions. If the number of samples $N_s$ is small, more precisely it is less than 2 $\log_2(N_r)$, samples are computed more efficiently with the alternative method, than with the method utilizing fractional Fourier transformation given in equations (1) to (5).

Therefore, in the preferred embodiment of the invention, the alternative method of slice samples computation described in equation (6) is used for the cases where the number of slice samples to be computed is small. Otherwise, if the number of samples to be computed is large, the fractional Fourier transform-based slice computation method described in equations (1) to (5) is used.

In the preferred embodiment, two or more slices of the cross-ambiguity function are computed to detect the presence of targets in the cross-ambiguity function plain. In one embodiment, called two-slice detection method, the detection takes place in two stages and is based on a single pulse.

Figure 4:
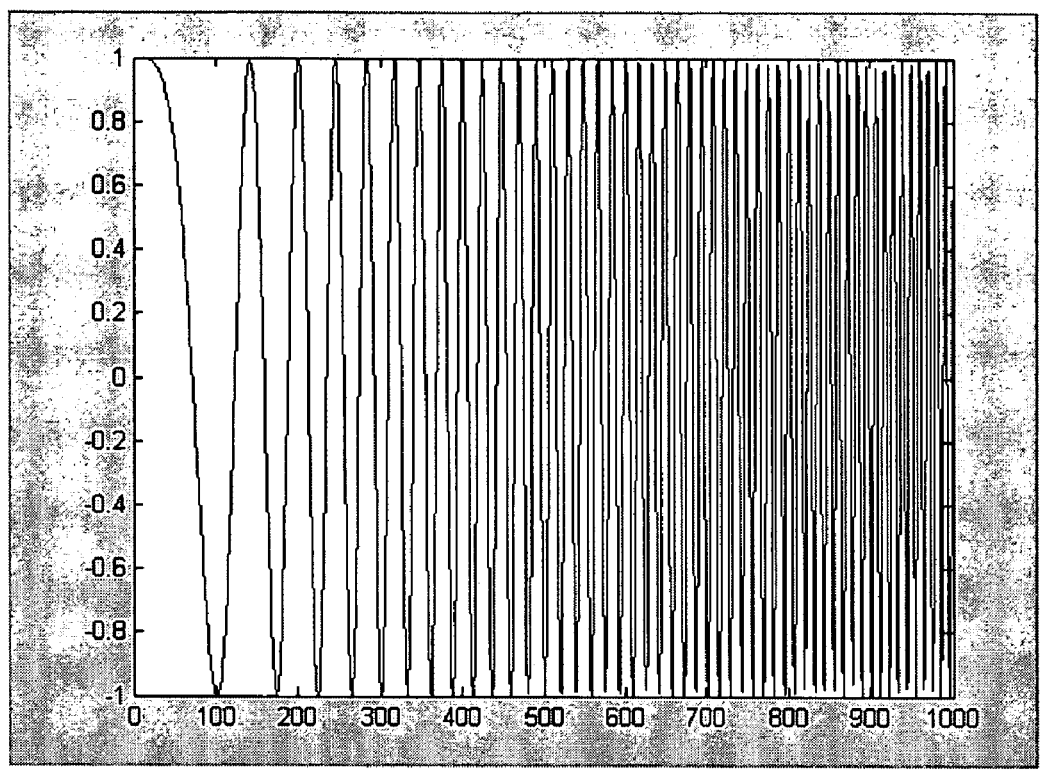
FIG. 4 is an illustration of a chirp pulse in time domain and in frequency domain.
Figure 4:
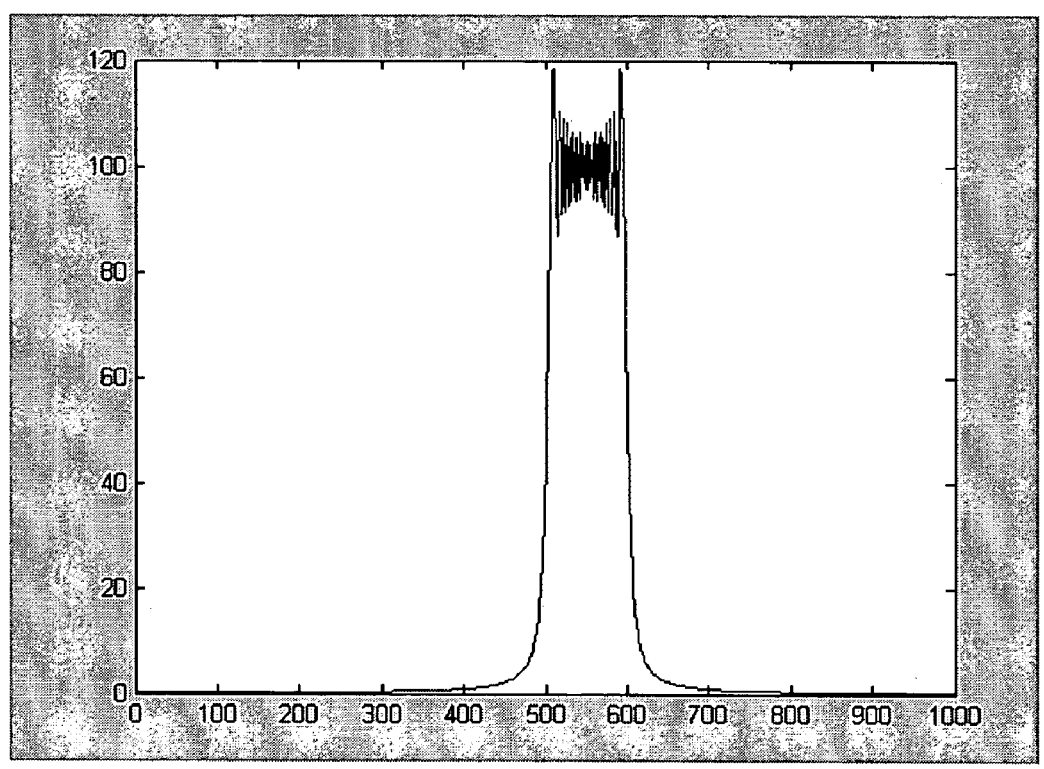
Figure 5:
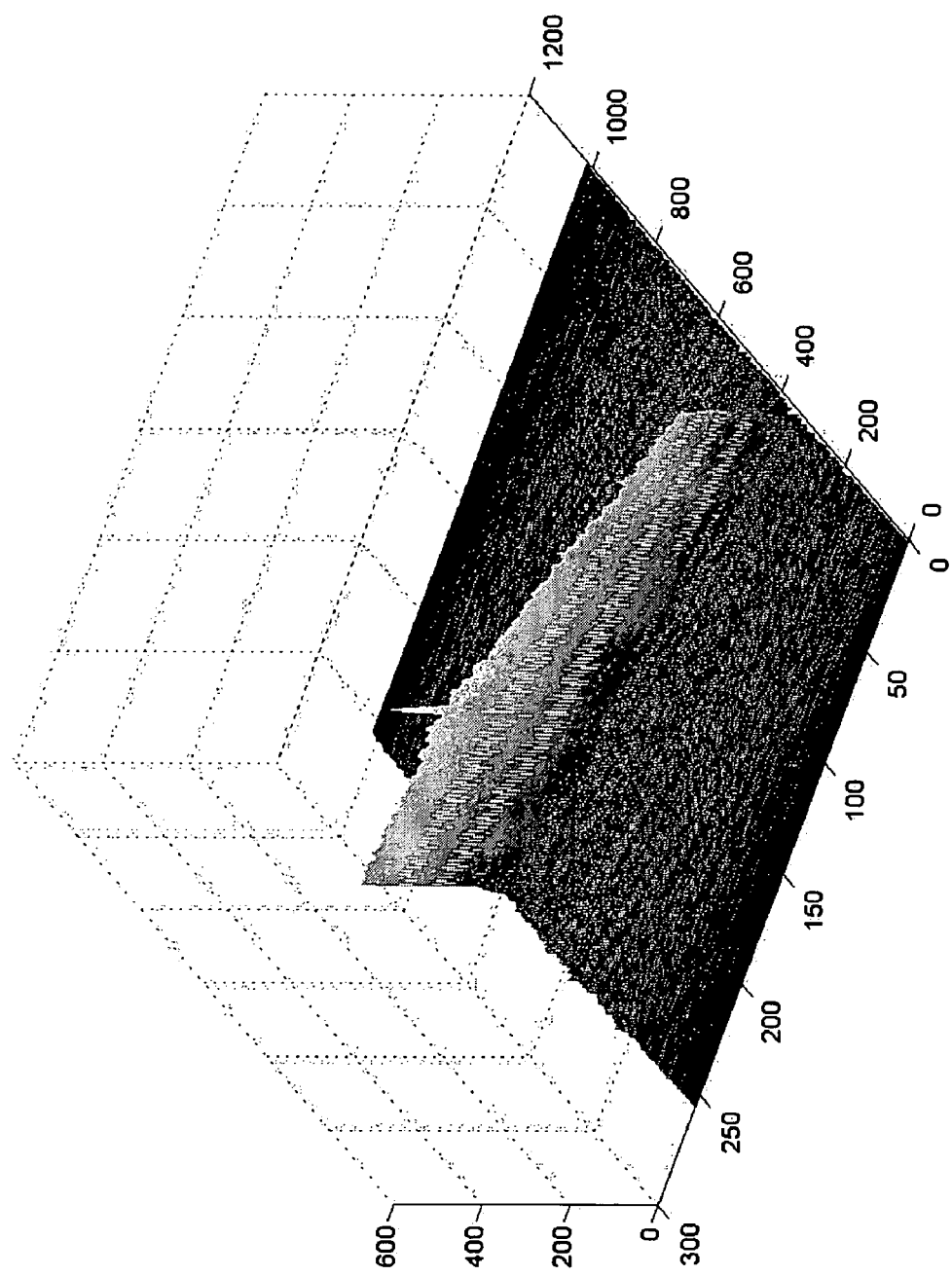
FIG. 5 is an illustration of a cross-ambiguity function of a normalized-mixture signal and its reflection from a single target, plotted in 3D.

The detection performance of the two-slice method of detecting targets in the cross-ambiguity function plain is related to the transmitted radar signal. There is a class of radar signals for which the two-slice method provides superior detection results. The radar signals in this class can be expressed as:

$$s_{um}(t)=(1-a)s_c(t)+as_{pn}(t) \; s_{nm}(t)=s_{um}(t)/|s_{um}(t)| \quad (7)$$

where $s_c(t)$ is a chirp, or linear FM signal (FIG. 4A illustrates a chirp pulse in time domain, and FIG. 4B illustrates the chirp pulse in frequency domain), and $s_{pn}(t)$ is a pseudo-noise signal, and a is the mixture parameter which assumes values between 0 and 1, $s_{um}(t)$ is the unnormalized-mixture signal and $s_{nm}(t)$ is the normalized-mixture signal. Since the normalized-mixture signal has unit amplitude, it can be transmitted at a constant peak-power level for efficient utilization of the radar transmitter. The cross-ambiguity function of the normalized-mixture signal shows a dominant ridge due to the chirp component in the mixture, and also a localized peak due to the pseudo-noise signal component in the mixture. The choice of the mixture parameter a determines the relative magnitudes between the ridge and the peak values on the cross-ambiguity function. In FIG. 5, magnitude of the cross-ambiguity function for a normalized-mixture signal with parameter a=0.5 is shown.

In the two-slice method, first, a slice of the cross-ambiguity function of the transmitted radar signal and its reflection is computed. Then, the samples of the computed slice are compared to a predetermined detection threshold. The slice is considered to have a peak when a sample, or a group of consecutive samples, exceeds the threshold. A slice may have one or more peaks. If there is one or more peaks detected on the first slice, one or more second slices are computed, each passing through the coordinates of the peak of the cross-ambiguity function detected on the first slice. The computed samples of one or more second slices samples are compared to a possibly different detection threshold. If there are one or more peaks exceeding the detection threshold, the coordinates of these peaks on the cross-ambiguity function plain forms the estimates for the range and Doppler velocity of the detected targets.

The orientation of the ridge in the cross-ambiguity function produced due to normalized-mixture signal and its reflection is known and it is virtually parallel to the Doppler shift axis. Therefore, to maximize the probability of detecting the presence of targets, the orientation of the first slice is chosen to be perpendicular to the Doppler shift axis and parallel to the time delay axis in the Doppler shift/time delay plain. Alternatively the orientation of the first slice may be selected so that the effects of clutter in the cross-ambiguity function intercepted by the slice are minimized. Then, once a target is detected, by detecting peaks on the first slice, the second slice is computed. The second slice passes through the coordinates of the peaks on the first slice, and its orientation is chosen to be parallel to the ridge.

Figure 6:
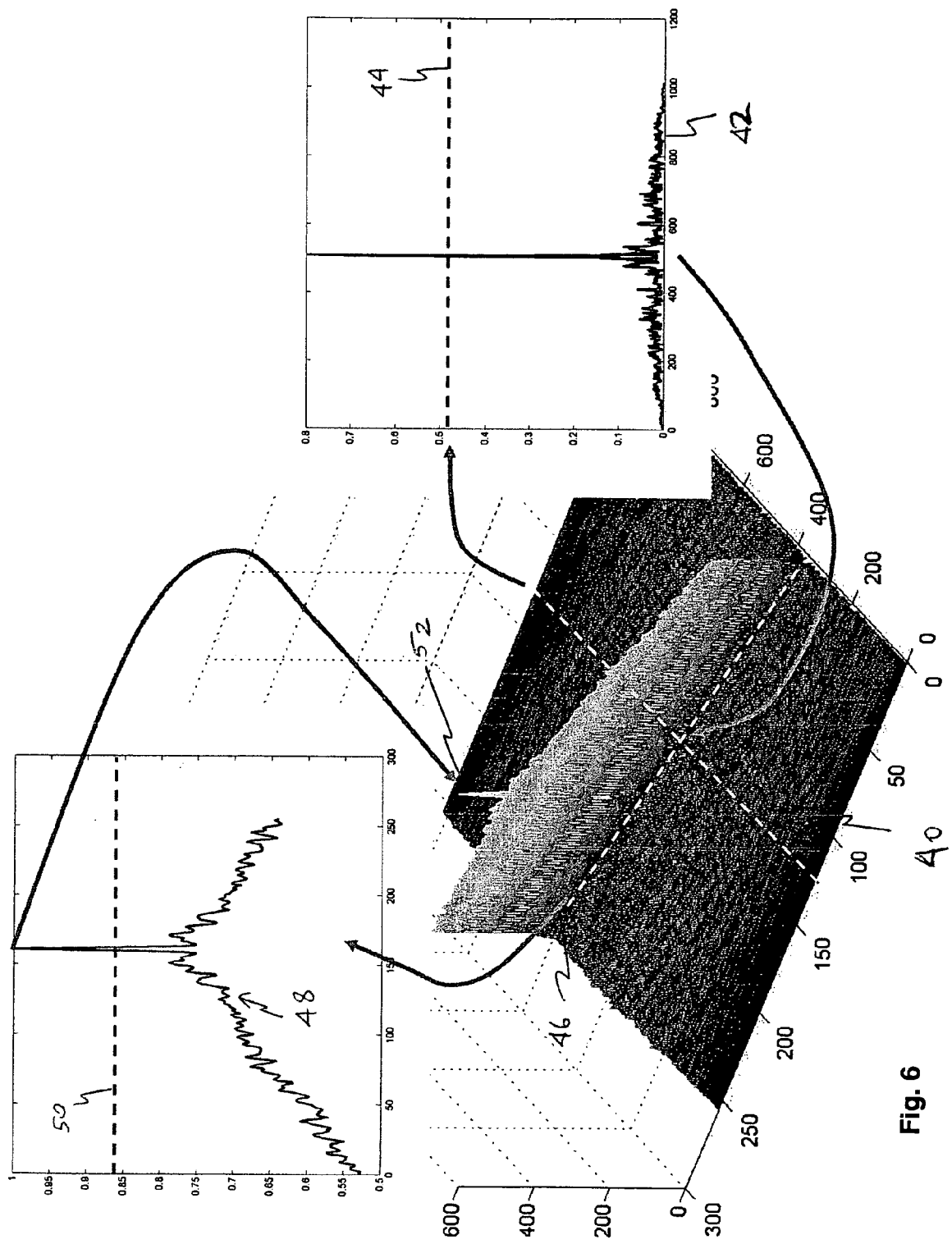
FIG. 6 is an illustration of two-slice detection method.

FIG. 6 illustrates the two-slice detection method. The first slice 42 is computed. Because the ridge of the cross-ambiguity function is virtually parallel to the Doppler-shift axis, the orientation of the slice 40 is chosen to be parallel to the time delay axis. This orientation makes the first slice virtually perpendicular to the ridge, thus maximizing the probability of target detection. Samples of the first slice are compared to the detection threshold 44. In this particular case there is only one peak. The second slice 48 is then computed. The slice passes through the coordinates of the peak on the first slice, and its orientation 46 is parallel to the ridge. Samples of the second slice 48 are compared to a possibly different threshold 50. In this particular case only one peak, corresponding to a single target, is detected on the second slice.

Figure 7:
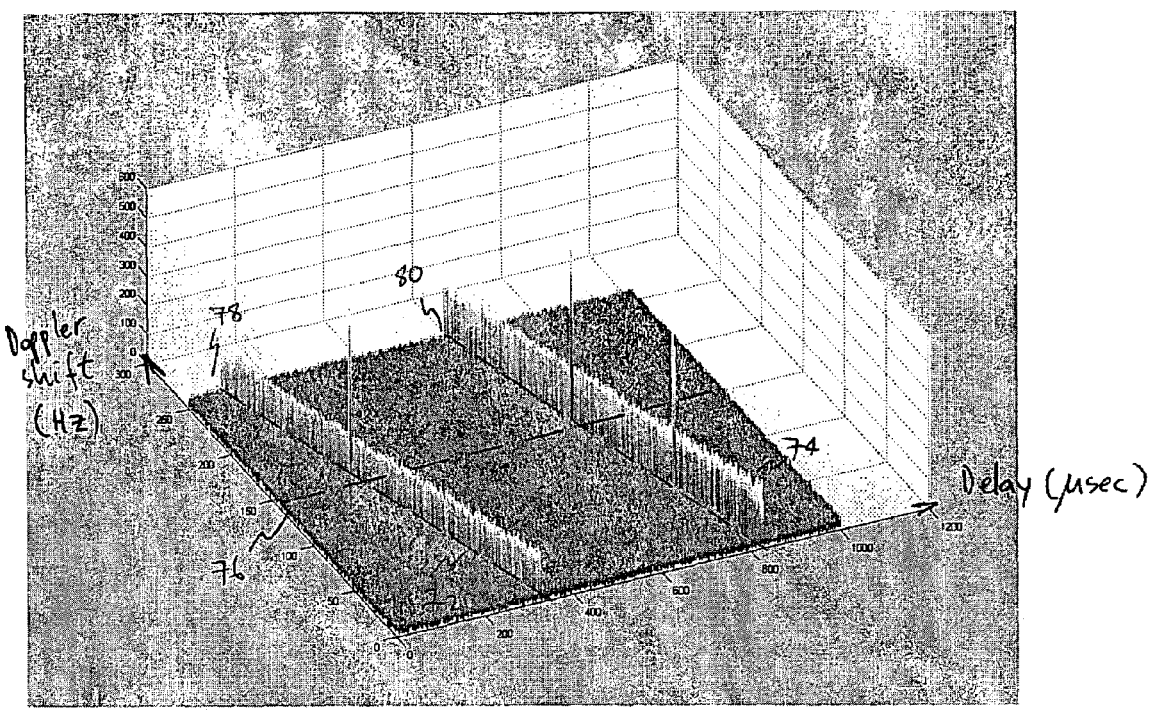
FIG. 7 is an illustration of a cross-ambiguity function of a normalized-mixture signal and its reflection from multiple targets, plotted in 3D.
Figure 8:
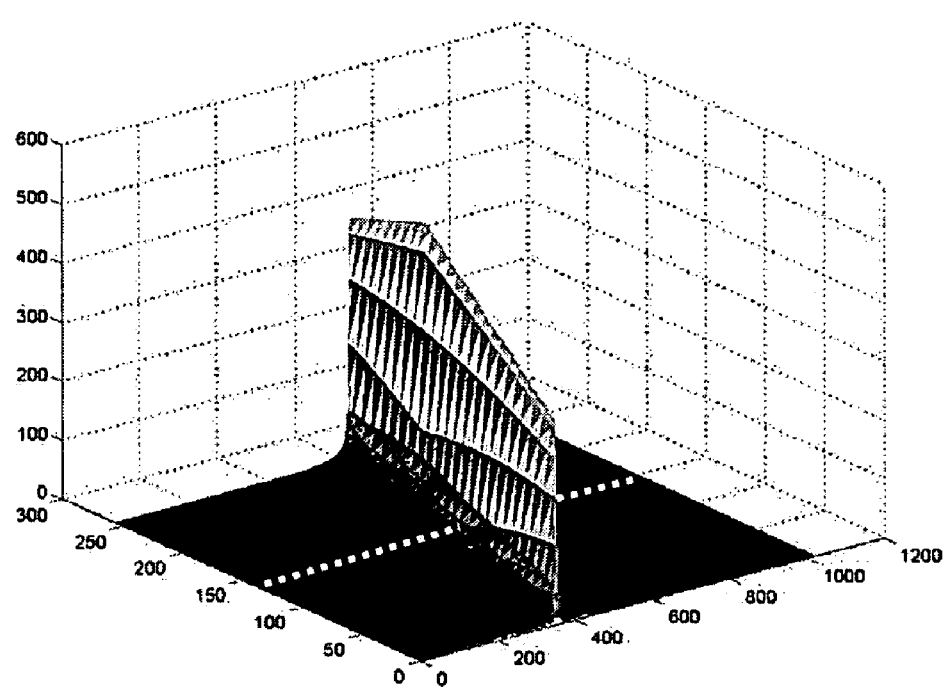
FIG. 8A is an illustration of a cross-ambiguity function of a chirp pulse and its reflection from a single target in the two-pulse-two-slice detection method, plotted in 3D.
FIG. 8B is an illustration of the first slice of the cross-ambiguity function illustrated in FIG. 8A.
Figure 8:
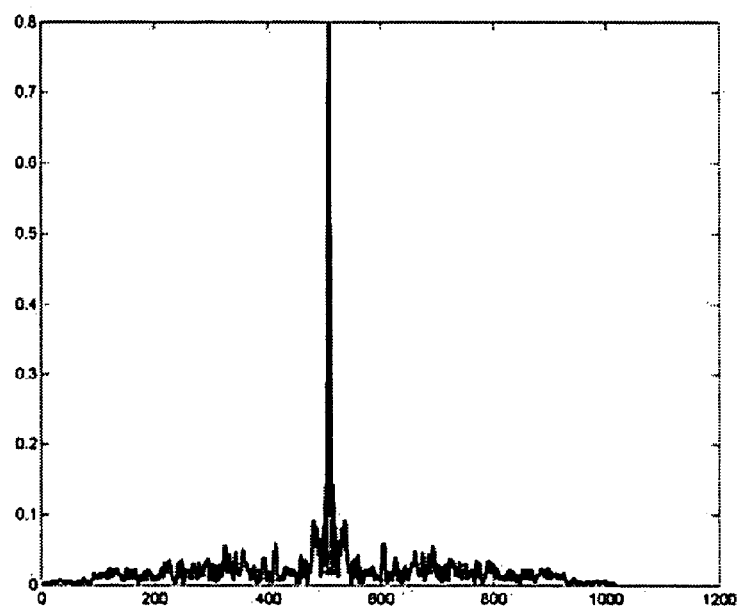

FIG. 7 illustrates a cross-ambiguity function obtained by analyzing the transmitted chirp pulse and its reflection from three targets. The cross-ambiguity function has two ridges.

When a first slice 76 is computed, it would have two peaks. Then two second slice oriented along the ridges passing through the coordinates of the peaks on the first slice are computed. One second slice 78, computed along ridge 72 has a single peak corresponding to a single target. Another second slice 80, computed along ridge 74 has two peaks corresponding to two targets, presently at the same distance from the sensor, but moving with different velocities. Ridge 72 has one peak corresponding to a single target at a Doppler shift of 150 Hz and a delay of 180 microseconds. Ridge 74 has two peaks corresponding to two targets with the following characteristics: the first target has a Doppler shifts of 150 Hz and the delay of 650 microseconds, and the second target has the Doppler shift of 70 Hz and the delay of 750 microseconds.

In another embodiment, called two-pulse-two-slice detection method, the first pulse may be a chirp pulse, or linear FM signal. This signal provides reliable detection of presence of targets, and is relatively insensitive to their corresponding Doppler shifts. However, the cross-ambiguity function of this signal may not be sufficiently localized for reliable determination of targets' coordinates. The first slice of the cross-ambiguity function of this first pulse and its reflection is computed at an angle that increases the probability of detecting one or more targets. In making the determination of the orientation of the slice, the expected Doppler shift produced by the target and the distribution of the radar clutter should be considered. For example, if it is desired to detect targets with the positive Doppler shifts, corresponding to approaching targets, and if there is a uniformly distributed clutter at low Doppler shifts, the orientation of the first slice is preferably selected so that the slice is parallel to the time delay axis, and crosses the Doppler axis at some positive Doppler shift which is beyond the Doppler spread of the clutter. FIG. 6A illustrates a case, in which a slice of the cross-ambiguity function which is parallel to the time axis is computed to detect the presence of a target in the Doppler shift/time delay plain and to determine the coordinates where the second slice should cross the first slice. Once one or more peaks are detected on the first slice, a second pulse is transmitted. This second pulse is a pseudo-noise signal which is sensitive to the Doppler velocity of the targets and has a localized cross-ambiguity function. Such localized cross-ambiguity function helps resolve closely spaced targets in the cross-ambiguity function plain.

Pseudo-noise signals, or other signals with highly localized cross-ambiguity functions, find limited applications in the detection of moving targets because of the computational complexity in detecting peaks in the cross-ambiguity plain. Such signals produce a spike in the cross-ambiguity domain, as shown in FIG. 9A. Typically, for signals with highly localized cross-ambiguity functions, a lot of computations are required to establish a presence of a target, thus such signals are not well suited for detection of targets. Since this search requires significant computational resources, other types of signals for which less computation is required to detect the target in the cross-ambiguity plain, such as chirped FM signals, are typically used in the search applications.

One aspect of the present invention is to facilitate the use of pseudo-noise like signals in the search applications. For this purpose, first a chirp FM type signal is transmitted to constrain the potential target locations on to an oblique line segment in the cross-ambiguity plain. FIG. 6 illustrates that a slice across the cross-ambiguity function plain of the chirp FM waveform enables detection of the target, and limits the potential locations of the target on the ridge of its cross-ambiguity function of the chirp pulse with its reflection. Once one or more targets are detected and localized with the first slice, the pseudo-noise pulse is sent and one or more slices of the cross-ambiguity function of the second pulse with its reflection are computed at an angle of the ridges of the cross ambiguity function of the first pulse with its reflection.

If the second pulse is transmitted shortly after the first pulse, the targets remain close to the identified line segments for their potential coordinates in the first transmitted pulse. Therefore, only one slice, which is identified after the processing of the first pulse, or few closely spaced parallel slices around this slice of the cross-ambiguity function of the second pulse can be computed for reliable detection for every target.

Figure 9:
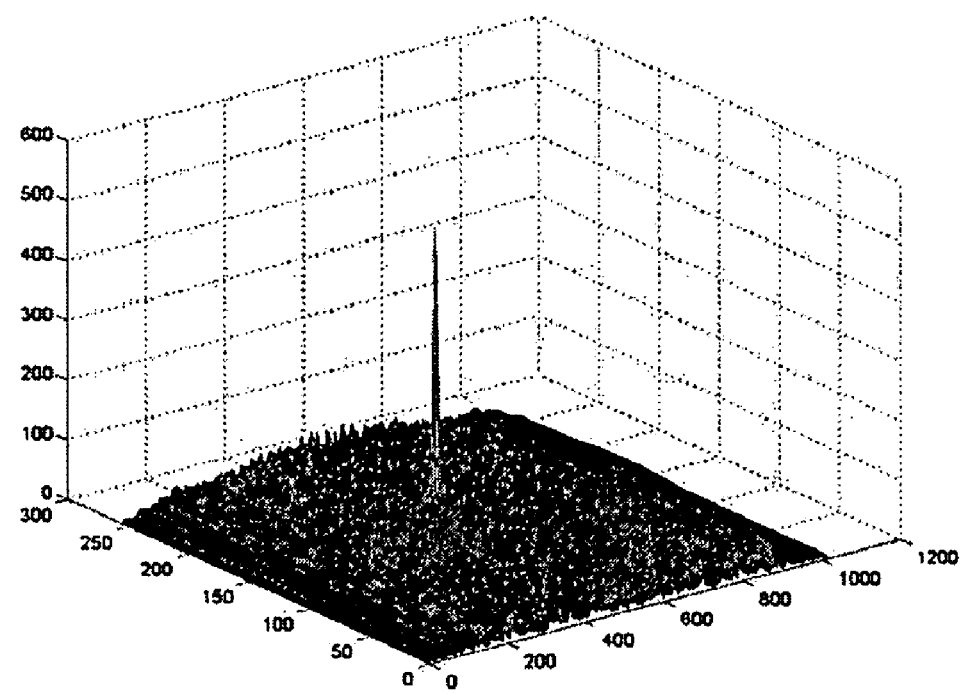
FIG. 9A is an illustration of a cross-ambiguity function of a pseudo-noise pulse and its reflection from a single target in the two-pulse-two-slice detection method, plotted in 3D.
FIG. 9B is an illustration of the second slice of the cross-ambiguity function illustrated in FIG. 9A.
Figure 9:
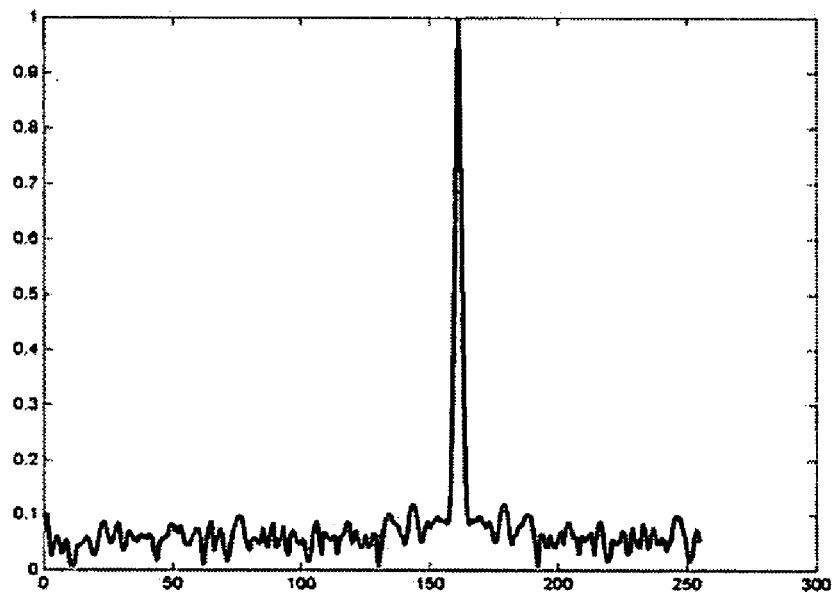

FIG. 9 illustrates computation of a second slice. The orientation of the second slice is parallel to the ridge of the cross-ambiguity function of the first pulse and the slice passes through the detected peak along the computed slice of the cross-ambiguity function of the first pulse.

Figure 10:
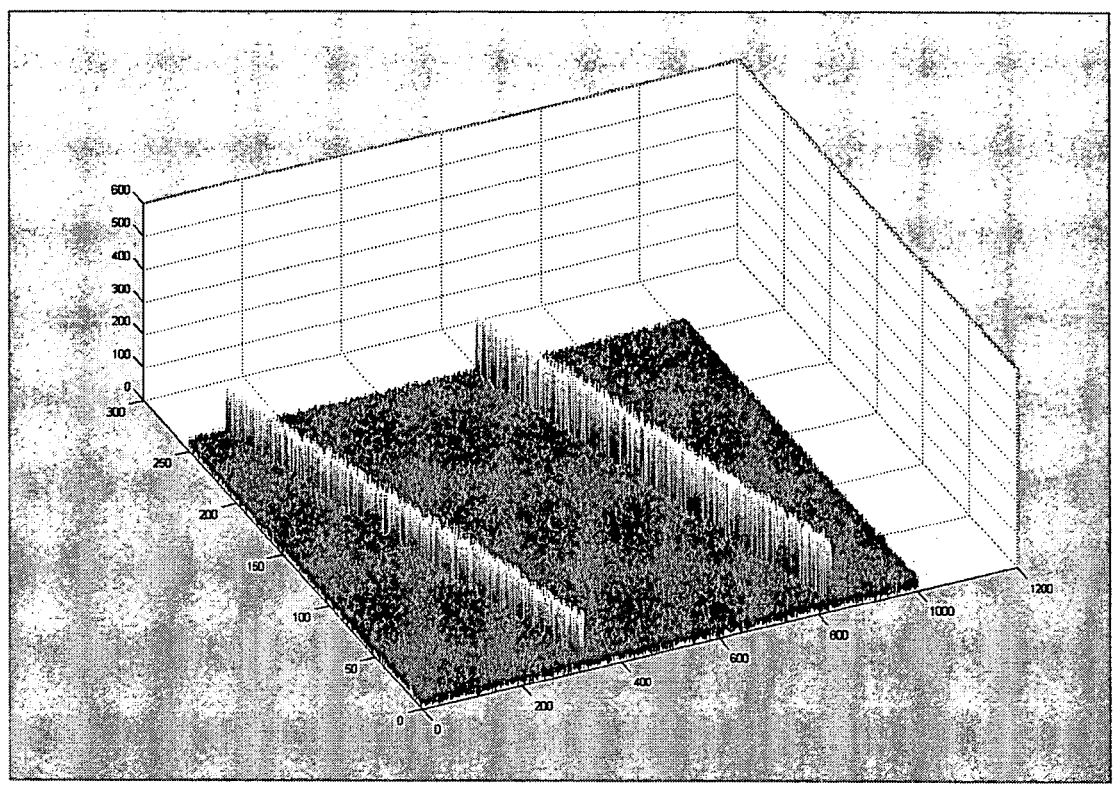
FIG. 10A is an illustration of a cross-ambiguity function of a chirp pulse and its reflection from multiple targets in the two-pulse-two-slice detection method plotted in 3D.
FIG. 10B is an illustration of a cross-ambiguity function of a pseudo-noise pulse and its reflection from multiple targets in the two-pulse-two-slice detection method, plotted in 3D.
Figure 10:
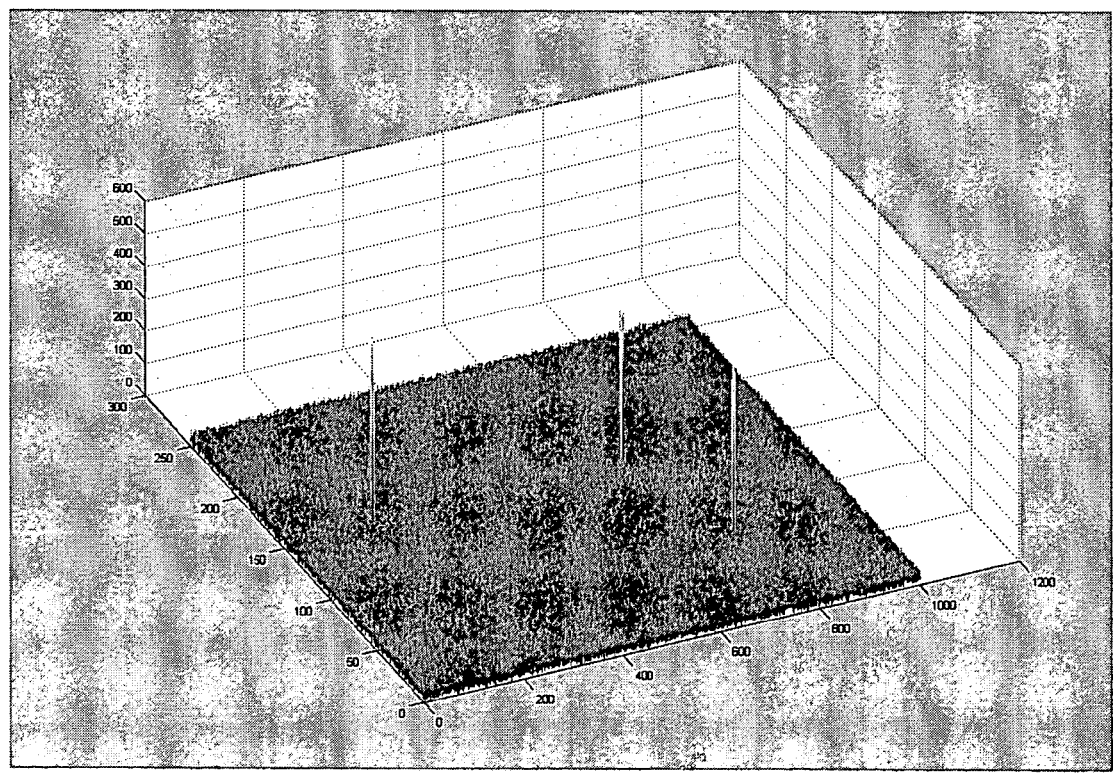

FIG. 10 illustrates cross-ambiguity functions for two pulses sent in two-pulse-two slice detection method. FIG. 10A shows a cross-ambiguity function which has two distinct ridges which is produced as a result of sending a chirp pulse and receiving its reflection from at least two objects. After the presence of two or more objects was detected by the peaks on the first slice. The second, pseudo-noise, pulse is sent. The cross ambiguity function of that pulse and its reflection has three distinct peaks corresponding the three targets.

The two-slice based detection of the present invention has two advantages over the projection-slice based detection of the invention disclosed in the U.S. Pat. No. 7,218,274. First, if there is a strong clutter return on the received signals, the detection performance with the use of a projection degrades. However, the slices of cross-ambiguity function that pass from the less cluttered areas of the cross-ambiguity function are less affected by the presence of the clutter and can still be used in the detection of targets. Second, the slices can be computed more efficiently than the projections. For a data frame of n samples, the two-slice detection method of the present invention requires about $4n\log(n)$ multiplications, whereas the projection-slice detection of the invention disclosed in the U.S. Pat. No. 7,218,274 requires $7n\log(n)$ multiplications.

Figure 11:
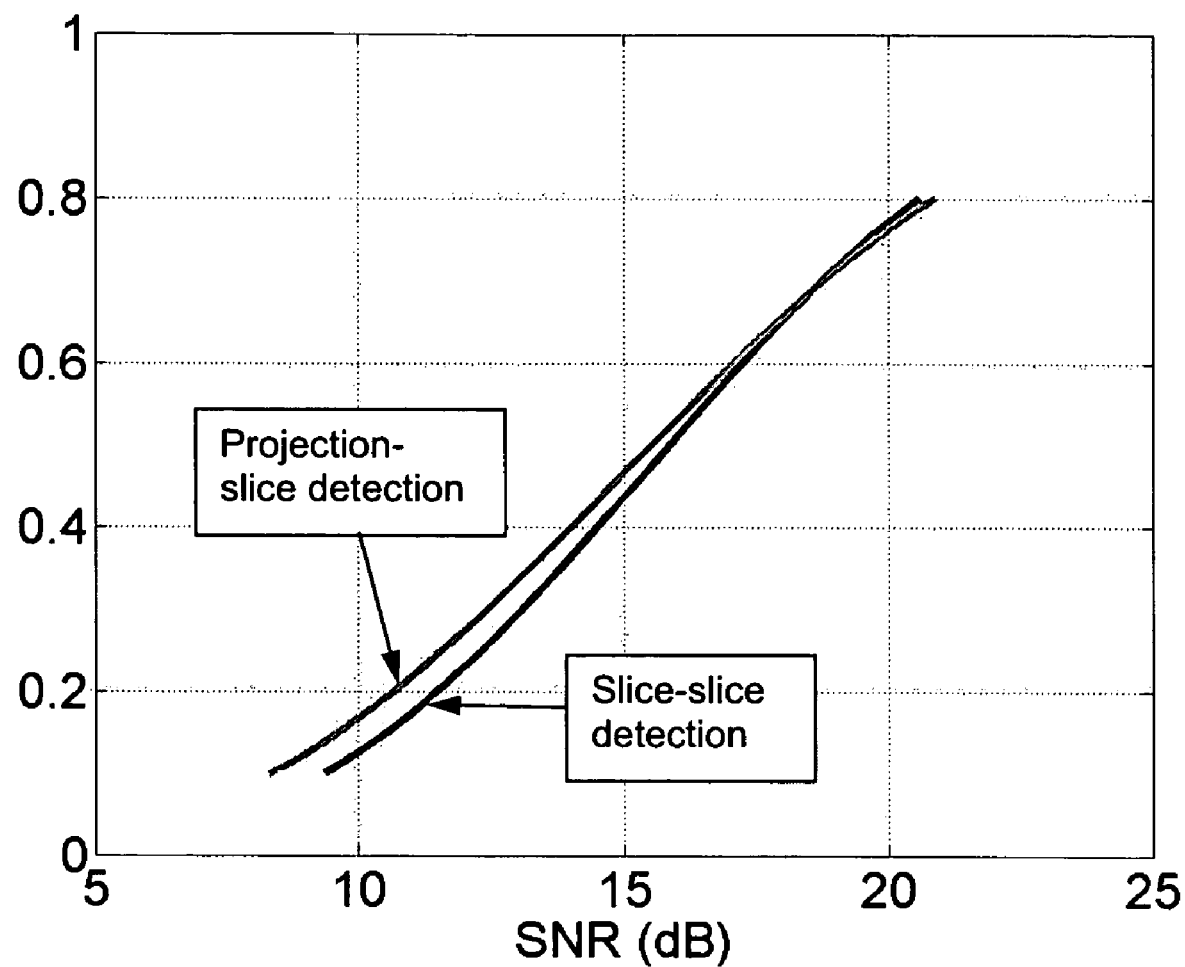
FIG. 11 is an illustration of the simulation results comparing the performance of the projection-slice detection method and the two-slice detection method.

The detection performance for a single transmitted pulse with the projection-slice detection method and two-slice detection method is about the same. To illustrate this, a simulated comparison of the two methods was conduced for an x-band radar. In this simulation the radar transmitted a pulse with the mixture parameter of 0.4, and duration of 0.5 msec. As shown in FIG. 11, the performance of the two-slice detection method and the performance of the projection-slice detection method are about the same. The probability of a false alarm for both projection-slice and two-slice detection methods is also the same.

Figure 12:
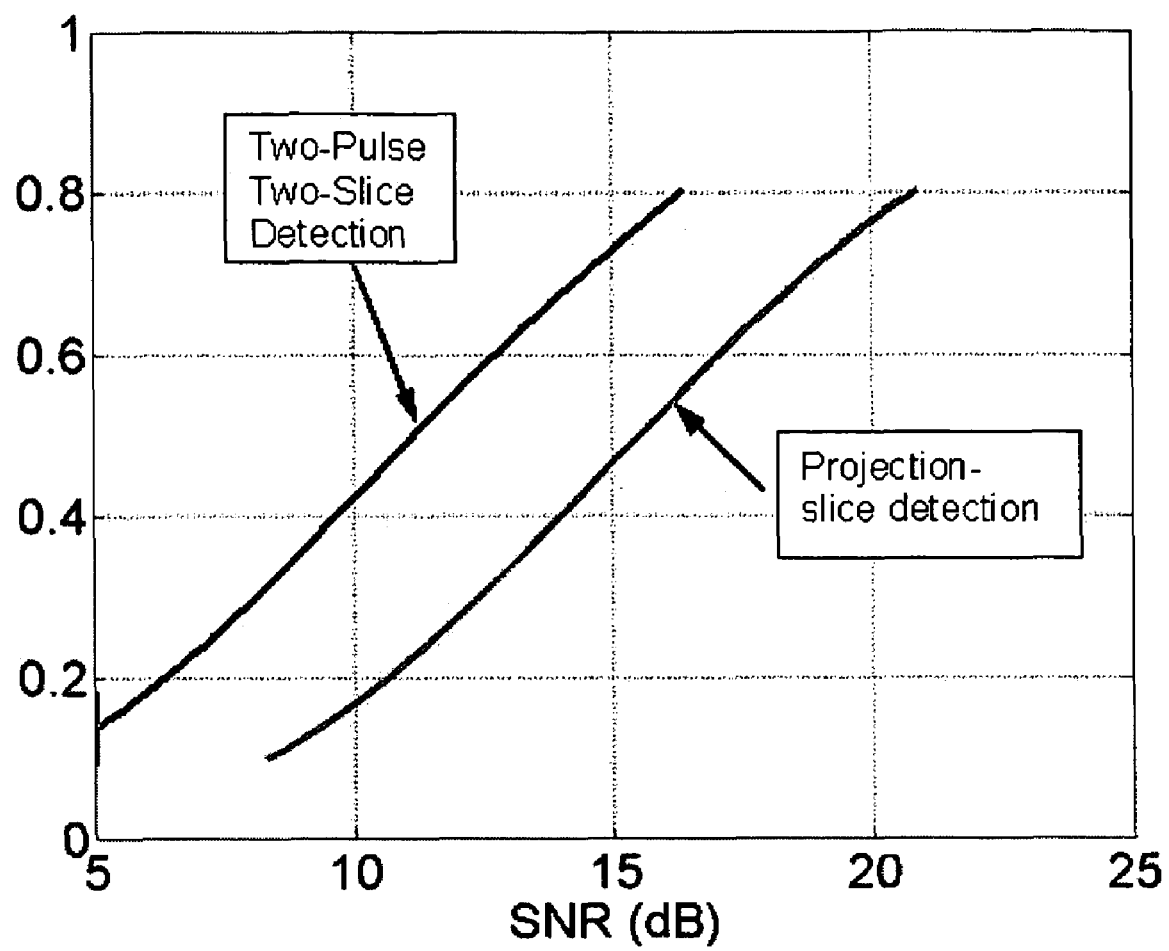
FIG. 12 is an illustration of the simulation results comparing the performance of the projection-slice detection method and the two-pulse-two-slice detection method.

The detection performance for the two-pulse-two-slice detection method was compared to the projection-slice detection method in a simulated comparison. As shown in FIG. 12 the performance of the two-pulse-two-slice detection method shows 4-5 dB detection sensitivity improvement over the projection-slice detection.

The invention described and claimed herein is not to be limited in scope by the exemplary embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

What is claimed is:

1. A method for detecting one or more targets comprising:
   transmitting a signal;
   receiving a reflection of the transmitted signal from one or more targets;
   computing a first slice of the cross-ambiguity function of the transmitted signal and the reflection of the transmitted signal;
   detecting one or more peaks on the first slice;
   computing one or more second slices of the cross-ambiguity function of the transmitted signal and the reflection of the transmitted signal through the coordinates of the detected peaks on the first slice; and
   detecting one or more peaks, corresponding to a distance to the detected targets and a relative velocity of the detected targets in the cross-ambiguity domain, on each second slice.

2. The method of claim 1 wherein the step of detecting one or more peaks on the first slice comprises:
   comparing samples of the first slice to a first predetermined threshold; and
   establishing a presence of a peak when one or more adjacent samples exceed the first predetermined threshold.

3. The method of claim 2 wherein the step of detecting one or more peaks on each second slice comprises
   comparing samples of a second slice to a second predetermined threshold; and
   establishing the presence of a peak when one or more adjacent samples of the second slice exceed the second predetermined threshold
   for each second slice.

4. The method of claim 1 where the first slice is computed by using calculations based on fractional Fourier transform.

5. The method of claim 4 where each second slice is computed by using calculations based on fractional Fourier transform.

6. The method of claim 1 wherein the step of computing the first slice of the cross-ambiguity function comprises:
   selecting an orientation of the first slice; and
   computing a first slice of the cross-ambiguity function of the transmitted signal and the reflection of the transmitted signal at the selected orientation.

7. The method of claim 6 wherein the step of selecting the orientation minimizes effects of clutter in the cross-ambiguity function intercepted by the first slice.

8. The method of claim 6 where the orientation is selected to be perpendicular to the Doppler shift axis of the cross-ambiguity function.

9. The method of claim 1 wherein the step of computing the second slice of the cross-ambiguity function comprises:
   selecting an orientation based on the nature of the transmitted signal; and
   computing one or more second slices of the cross-ambiguity function of the transmitted signal and the reflection of the transmitted signal through the coordinates of the detected peaks on the first slice at the selected orientation.

10. The method of claim 1 wherein the first slice is computed by using a Doppler compensated matched filter.

11. The method of claim 1 wherein one ore more second slices are computed by using a Doppler compensated matched filter.

12. The method of claim 1 where the transmitted signal is a summation of a chirp pulse and a pseudo-noise pulse.

13. A method of computing a slice of an ambiguity function at an arbitrary angle comprising:
    acquiring a signal; and
    computing the slice of the ambiguity function of the acquired signal and a reference signal using a Doppler compensated matched filter.

14. The method of claim 13 where the Doppler compensated matched filter is based on the following equation:

$$A_{rs}(\tau_o + \lambda_k \sin\phi, v_o + \lambda_k \cos\phi) = \int r(t + (\tau_o + \lambda_k \sin\phi)/2) s^* (t - (\tau_o + \lambda_k \sin\phi)/2) \times \exp[-j2\pi(v_o + \lambda_k \cos\phi)t] dt.$$

where $\tau_o$ and $v_o$ are the starting point of the slice, $\lambda_k$ s the distance from the start point $(\tau_o, v_o)$ to the $k^{th}$ slice data sample and $\phi$ is the angle of the slice.

15. A method for detecting one or more targets comprising:
    transmitting a first signal;
    receiving a reflection of the first transmitted signal from one or more targets;
    computing a first slice of the cross-ambiguity function of the first transmitted signal and the reflection of the first transmitted signal;
    detecting one or more peaks on the first slice;
    transmitting a second signal;
    receiving a reflection of the second transmitted signal from one or more targets;
    computing one or more second slices of the cross-ambiguity function of the second transmitted signal and the reflection of the second transmitted signal, the second slices passing through the coordinates of the peak on the first slice; and
    detecting one or more peaks, corresponding to a distance to the detected targets and a relative velocity of the detected targets in the cross-ambiguity domain, exceeding a second predetermined threshold on each second slice.

16. The method of claim 15 wherein the step of detecting one or more peaks on the first slice comprises
    comparing samples of the first slice to a first predetermined threshold; and
    establishing the presence of a peak when one or more adjacent samples exceed the first predetermined threshold.

17. The method of claim 16 wherein the step of detecting one or more peaks on each second slice, for each second slice, comprises:
    comparing samples a second slice to a second predetermined threshold; and
    establishing the presence of a peak when one or more adjacent samples of the second slice exceed the second predetermined threshold.

18. The method of claim 15 where the first slice is computed by using calculations based on fractional Fourier transform.

19. The method of claim 18 where each second slice is computed by using calculations based on fractional Fourier transform.

20. The method of claim 15 wherein the first slice is computed by using a Doppler compensated matched filter.

21. The method of claim 15 wherein one or more second slices are computed by using a Doppler compensated matched filter.

22. The method of claim 15 wherein the first transmitted signal is a chirp signal.

23. The method of claim 15 wherein the second transmitted signal is a pseudo-noise signal.

24. The method of claim 15 wherein the step of computing the first slice of the cross-ambiguity function comprises:
   selecting an orientation of the first slice; and
   computing a first slice of the cross-ambiguity function of the first transmitted signal and the reflection of the first transmitted signal at the selected orientation.

25. The method of claim 24 wherein the step of selecting the orientation minimizes effects of clutter in the cross-ambiguity function intercepted by the first slice.

26. The method of claim 24 where the orientation is selected to be perpendicular to the Doppler shift axis in the cross ambiguity function.

27. The method of claim 15 wherein the step of computing the second slice of the cross-ambiguity function comprises:
   selecting an orientation based on the nature of the first transmitted signal; and
   computing one or more second slices of the cross-ambiguity function of the second transmitted signal and the reflection of the second transmitted signal through the coordinates of the detected peaks on the first slice at the selected orientation.

28. The method of claim 15 wherein the step of transmitting the second signal occurs within close temporal proximity of the step of transmitting the second signal.

29. A method for detecting one or more targets comprising:
   transmitting a first signal;
   receiving a reflection of the first transmitted signal from one or more targets;
   computing a first slice of the cross-ambiguity function of the first transmitted signal and the reflection of the first transmitted signal;
   detecting one or more peaks on the first slice;
   transmitting a second signal;
   receiving a reflection of the second transmitted signal from one or more targets;
   computing one or more sets of second slices of the cross-ambiguity function of the second transmitted signal and the reflection of the second transmitted signal, wherein each set comprises:
      (1) a slice passing through the coordinates of the peak on the first slice; and
      (2) one ore more slices offset in time but parallel to the slice passing through the coordinates of the peak on the first slice;
   detecting one or more peaks, corresponding to a distance to the detected targets and a relative velocity of the detected targets in the cross-ambiguity domain, on the second slice.

* * * * *